J. E. CAMP.
HYDRAULIC MOTOR FOR PORTABLE GRAIN DUMPS.
APPLICATION FILED SEPT. 25, 1905.
909,278.
Patented Jan. 12, 1909.
2 SHEETS—SHEET 1.
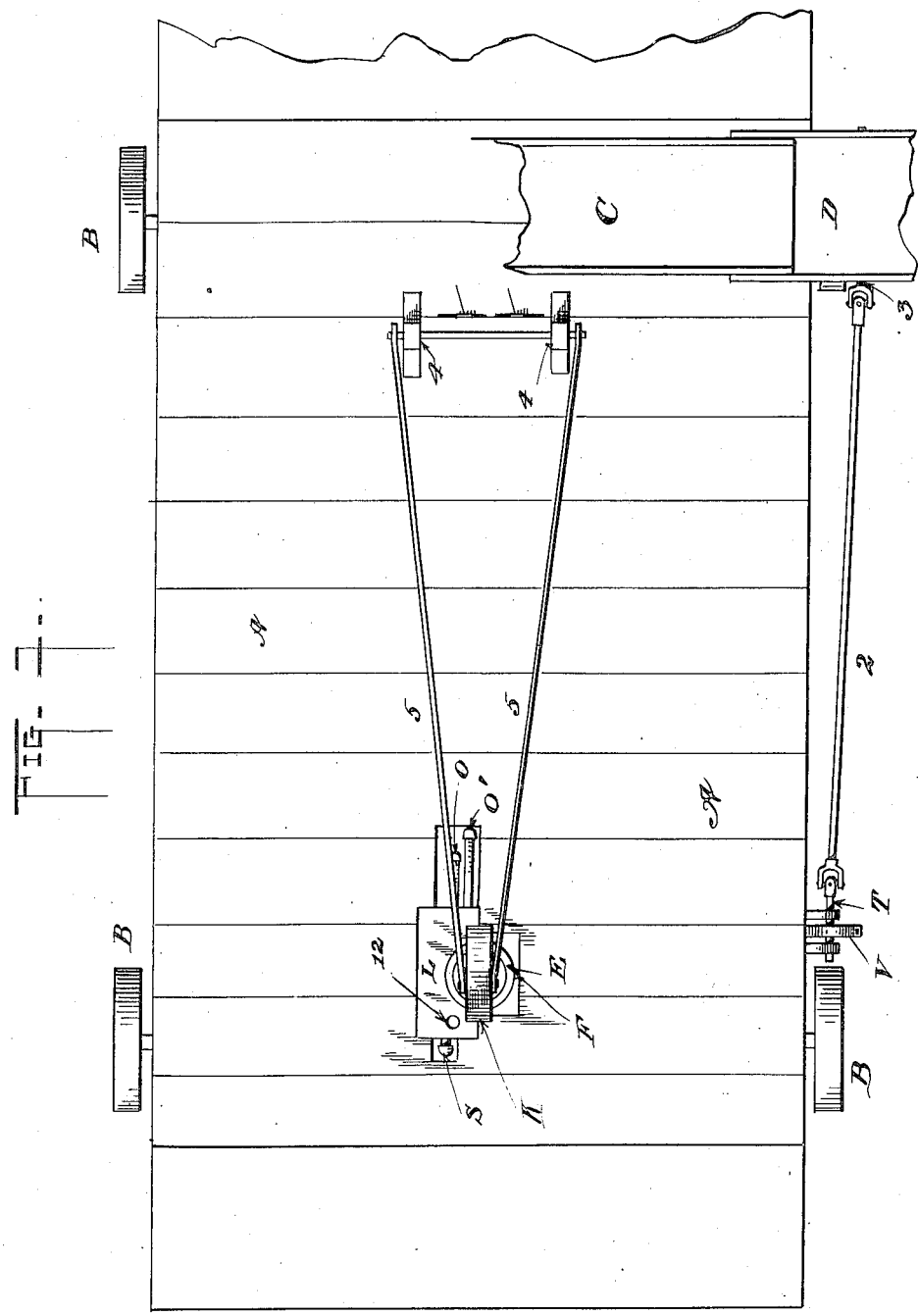

J. E. CAMP.
HYDRAULIC MOTOR FOR PORTABLE GRAIN DUMPS.
APPLICATION FILED SEPT. 25, 1905.
909,278.
Patented Jan. 12, 1909.
2 SHEETS—SHEET 2.
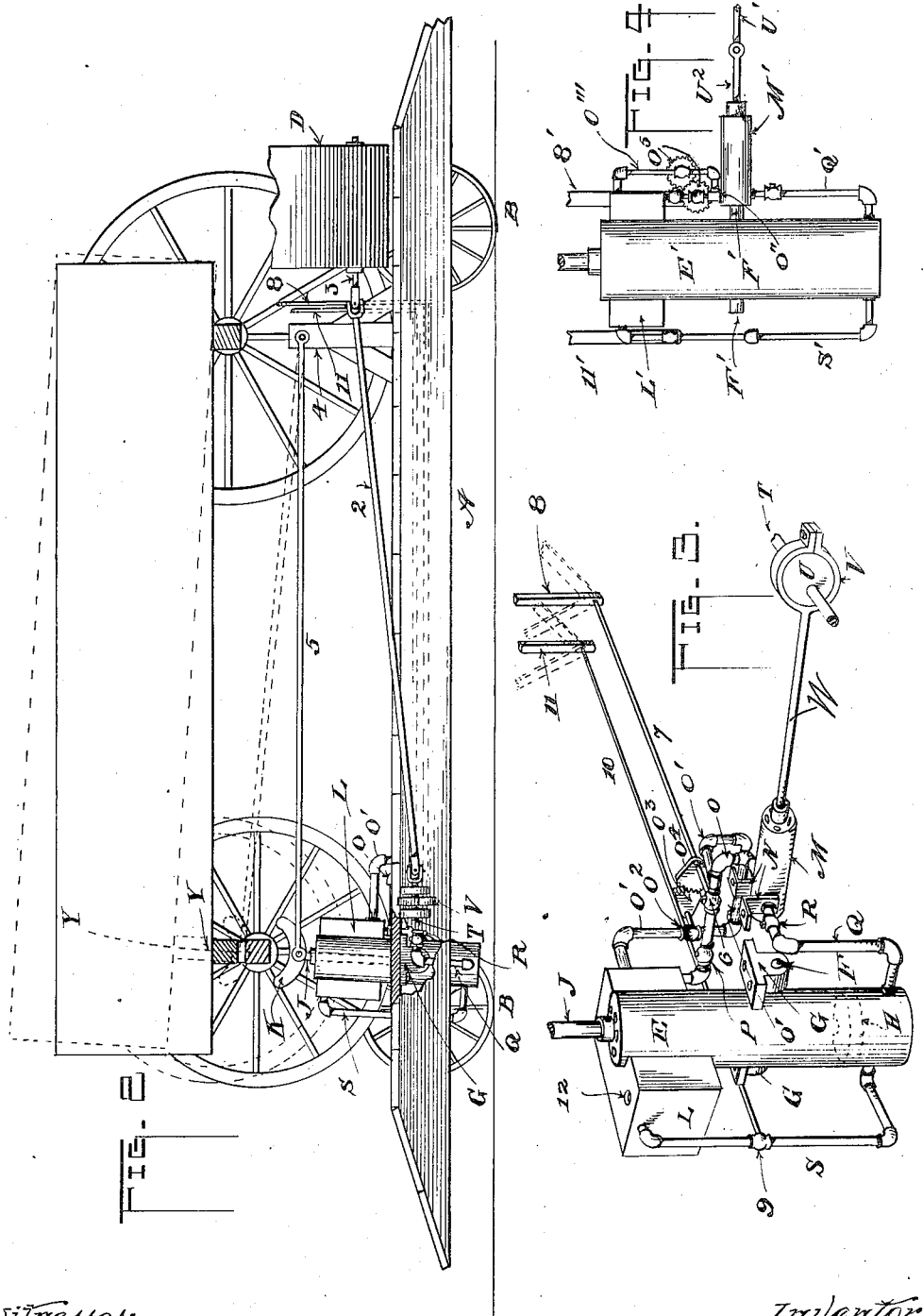
Inventor:
Joseph E. Camp,
By L. M. Thurlow,
Atty.

UNITED STATES PATENT OFFICE.

JOSEPH EDWARD CAMP, OF WASHINGTON, ILLINOIS, ASSIGNOR TO CAMP BROS. & CO., OF METAMORA, ILLINOIS, A CORPORATION OF ILLINOIS.

HYDRAULIC MOTOR FOR PORTABLE GRAIN-DUMPS.

No. 909,278.     Specification of Letters Patent.     Patented Jan. 12, 1909.

Application filed September 25, 1905. Serial No. 279,977.

*To all whom it may concern:*

Be it known that I, JOSEPH E. CAMP, citizen of the United States, residing at Washington, in the county of Tazewell and State of Illinois, have invented certain new and useful Improvements in Hydraulic Motors for Portable Grain-Dumps; and I do hereby declare that the following is a full, clear, and exact description of the invention, which will enable others skilled in the art to which it appertains to make and use the same.

My present invention pertains to portable grain dumps, or wagon dumps of that class wherein a movable platform is employed upon which to drive a loaded wagon whose contents are to be delivered into a conveyer and elevator for storing or other purposes.

The object of the present invention is to provide an extremely simple device of low cost for tilting the wagon to a dumping position.

A further object is to provide a hydraulic mechanism for thus tilting the wagon.

A further object is to provide a hydraulic mechanism for raising the wagon slowly and permitting said wagon to lower quickly after deliverance of the load therefrom.

In the appended drawings forming part of this application, Figure 1 is a top view of my portable grain dump. Fig. 2 is a side elevation of the same. Fig. 3 is a perspective view of the hydraulic mechanism employed in the dump. Fig. 4 is a slightly modified form of the invention.

I provide a platform A for receiving the wagon and carrying the dumping mechanism, mounting it upon wheels B to make it portable though of course other methods of transportation can be employed instead. In use the wheels are let into holes dug in the ground when the dump has been properly positioned for work so that the platform will rest upon the top of the ground and have a firm foundation.

At the rear end of the platform is located a conveyer or drag C pivoted at one end so as to tip and raise out of the way to allow the wagon to pass. This pivotal support and connection, however, is not shown herein since it is well known and furthermore forms no part of my invention. I have also indicated an elevator D commonly used on devices of this class into which the conveyer is designed to deliver its contents. But none of its parts or supporting means are shown except the driving connection between it and the wagon raising mechanism to be described.

Near the forward end of the platform and at the middle of the width thereof is stationed a hydraulic cylinder E. This occupies a substantially vertical position and is supported on trunnions F carried in bearings G secured to the under side of the platform, see Fig. 2. A piston and piston rod H and J respectively are provided for the cylinder and have a substantially vertical movement, the upper end of the said piston rod carrying a saddle K designed to receive the front axle of the wagon, said saddle normally occupying the lowest position shown in Fig. 2 so that the axle can pass over it. Near the top of the cylinder is a reservoir L for containing oil or water, the former being preferable, and at M is a pumping cylinder pivoted at one end between ears N secured to the under side of the platform but shown detached in Fig. 3. A pipe O connects the bottom of the reservoir with the said pumping cylinder and is provided with a check-valve P for permitting flow of the fluid to the said cylinder but not in the opposite direction. The cylinder M is also connected with the bottom of the cylinder E by a pipe Q which is likewise provided with a check-valve R for allowing the fluid to pass toward the said cylinder E but prevent passage thereof in the contrary direction. The bottom of the cylinder E is connected by a pipe S with the top of the reservoir L. Journaled at the side of the platform is a shaft T carrying an eccentric U, the latter being surrounded by an eccentric-strap V at the end of a piston-rod W having a piston X within a pump M. The shaft T is connected by means of a tumbling-rod 2 with the shaft 3 of the elevator D as shown by which power applied to the elevator gearing is transferred to the said shaft T and its eccentric to operate the piston within the pump M as will be understood by a study of Fig. 3.

At the rear end of the platform two uprights are stationed as at 4 these being about the same height as the saddle K of the cylinder E. A rod 5 is pivoted at each side of the said saddle and each extends back to the top of the uprights 4 to which they are also pivoted. It will be noted that the rods 5 are substantially equal in length to the distance between the axles of the wagon so that as their forward ends rise with the saddle they cause the latter to describe practically the same arc of movement as the front axle describes as the wagon tilts on its rear axle.

In operation the elevator imparts a continuous motion to the eccentric U through the tumbling-rod and shaft T the pump M being therefore in continuous operation, though as a matter of fact means could be provided for disconnecting the elevator and shaft T if desired. With the pump in operation the fluid to be handled is drawn from the receptacle or tank L and forced into the bottom of the cylinder E, the pressure slowly raising the piston J. The wagon being positioned as shown in Fig. 2 will likewise be raised as the saddle K meets the front axle thereof. When at the desired height a cut-off valve 6 in the pipe O is turned, by means of a rod 7 and lever 8 to interrupt the flow of fluid to the pumping cylinder. The wagon remains at the height at which it is stopped provided that a valve 9 in the pipe S is closed to the passage of fluid therethrough from the cylinder E to the tank L said valve being operated by a rod 10 and lever 11 similar to and positioned the same as the rod 7 and lever 8 just described. If, however, the valve 9 is opened the fluid in the cylinder E is forced through the pipe S to discharge into the tank L by the weight of the wagon resting thereon through the piston and piston-rod. Evidently the wagon may be lowered as slow or fast as desired by the simple adjustment of the said valve 9. Since the pump M is in continual motion, in my present arrangement, I provide means for relieving the pressure within it by connecting the pipe O with the tank L by means of a pipe O', the connection with said pipe O being between the valve 6 and the pump M, there being a valve O² in said pipe O' the stem of which carries a toothed segment O³ to mesh with a similar member O⁴ on the valve rod 7 of the valve 6. It will be noted that when the said valve 6 is closed to interrupt the flow of fluid to the pump M the valve O² will be simultaneously opened to allow the pump to relieve itself by having a free passage to and from the tank. Evidently when the valve 6 is again opened the valve O² will be immediately closed no attention being paid to it. As a matter of fact the pipe O' need not terminate within the tank L since it does not and need not necessarily carry oil back and forth therethrough but merely provides relief for the pump and therefore can be merely extended upward into the air high enough to prevent loss of any oil that remains within the pump at the time the supply of oil thereto is stopped.

The valve 9 in the pipe S is always closed when the wagon is being raised in order to put the fluid under pressure in the cylinder E, it being opened only when the wagon is to be lowered. In the top of the tank is an opening 12 for entrance and escape of air as the level of the fluid varies. The top of the tank is preferably closed so as to prevent spilling the fluid during the transportation of the dump.

The cylinder E is provided with the trunnions F so that it can pivot thereon and in this way there can be no binding of the piston or piston-rod therein. It is quite evident, however, that the pivotal movement of the piston will be very slight since the arc which its saddle K described is practically a straight line as lying parallel to the axis of the cylinder dotted line Y in Fig. 2 indicates. There is allowed sufficient spring in the pipes Q and O to permit the slight swinging movement that may exist in said cylinder. The tank L and the pipe S are carried with the cylinder but the valve-rod 10 for controlling the valve 9 in said pipe S can spring to permit the tipping of the latter. This is also true of the valve-rod 7 to allow the tilting of the pipe O.

In the position of rest the valve 9 is in the open position while the valve 6 is closed and the valve O² necessarily open. The operator at any time then reverses the positions thereof permitting the wagon to arise to the desired height where the raising movement can be arrested at any time or place.

When placing the wagon dump in position at a destination, a hole is made for each wheel and one also for the lower end of the cylinder, E in order that the platform may rest completely and solidly upon the ground. As before stated water or oil may be used and the device may be arranged to use air although a fluid is to be preferred since it is more easily controlled. In using the device as arranged but two levers are needed to have the mechanism under perfect control. The entire device is in reality quite simple in construction and may be placed on any wagon dump already built since it is constructed in one entire portable member the parts all being connected together except as to the valve rods 10 and 7 and the pistons J and W. I do not wish to confine myself to the exact construction and arrangement herein shown since it may be changed in various ways to acquire the same results. As an instance of such a change I show in Fig. 4 a cylinder E' and oil reservoir L' or tank and one of the pivot members F', which correspond to F in the other figures, with a pump M' centralized therewith. The pipes O'', Q', S' and O''' corresponding with the pipes O, Q, S and O' respectively of the other figures and connected in substantially the same manner to the pump and cylinder E, with the check-valves and cut-off valves as before, there being gear wheels O⁵ on the stems of the valve-rods which, however, are not seen but the levers 11' and 8' are shown and correspond with 11 and 8 of the previous figures as will be understood. In this case I have pivotally connected the eccentric rod U' with the piston-rod U² of the pump without pivoting said pump as before. This makes a more compact and possibly preferable construction, the cylinder and pump being cast in one member if desired thus reducing the cost of manufacture.

I claim—

1. A portable hydraulic lift comprising a cylinder and its piston, a fluid container, and a pump adapted for continuous operation, both portable with the cylinder, a fluid connection between and connecting the container with the lower end of the cylinder, a normally closed cut-off valve therein, a fluid connection between and connecting the lower end of the cylinder and the pump, a check valve in the same adapted to permit flow of fluid towards the cylinder, a fluid connection between and connecting the fluid container with the pump, a cut-off valve therein, a second fluid connection between and connecting the fluid container and the pump, a check valve therein for permitting the flow of fluid towards the pump, a cut-off valve also in said second fluid connection, and means for operating the pump to introduce fluid into the cylinder to raise the piston, the said cut-off valves adapted for simultaneously interrupting the flow of fluid to the cylinder and opening a relief from the pump to the container whereby to interrupt the raising movement of the piston.

2. A portable hydraulic lift comprising a cylinder and its piston, a fluid container, and a pump adapted for continuous operation, both portable with the cylinder, a fluid connection between and connecting the container with the lower end of the cylinder, a normally closed cut-off valve therein, a fluid connection between and connecting the lower end of the cylinder and the pump, a check valve in the same adapted to permit flow of fluid towards the cylinder, a fluid connection between and connecting the fluid container with the pump, a cut-off valve therein, a second fluid connection between and connecting the fluid container and the pump, a check valve therein for permitting the flow of fluid towards the pump, a cut-off valve also in said second fluid connection, and means for operating the pump to introduce fluid into the cylinder to raise the piston, the said cut-off valves adapted for simultaneously interrupting the flow of fluid to the cylinder and opening a relief from the pump to the container whereby to interrupt the raising movement of the piston, the opening of the normally closed valve permitting the piston to lower by permitting the return of fluid from beneath it back to the container.

3. A cylinder, a piston therefor, a container for fluid to be pumped into the cylinder for raising the piston, a pump, a pipe connecting the pump with the fluid container, a manually operated valve therein, a second pipe connecting the pump with the container, a check valve and a manually operated valve therein, the latter when closed automatically opening the first said manually operated valve for the purposes explained, a pipe connecting the pump with the cylinder, a check valve therein, a pipe connecting the cylinder with the fluid container, and a manually operated cut-off valve therein normally closed at the time fluid is pumped into the cylinder or when the piston is raised and at rest, and opened to permit the elevated piston to lower.

4. A cylinder, a piston therefor, a container for fluid to be pumped into the cylinder to raise the piston, a continuously operated pump, a pipe for connecting the pump with the fluid container, a cut-off valve therein, a second pipe connecting the pump with the container, a cut-off valve and a check valve therein, means for automatically opening the cut-off valve in the first pipe when that in the second pipe is in the act of closing for the purposes explained, a pipe connecting the pump with the cylinder, a check valve therein, a pipe connecting the cylinder with the fluid container, and a cut-off valve therein normally closed when pumping fluid into the cylinder or when the piston is raised and at rest, and opened to permit the elevated piston to lower.

5. A cylinder and piston, pressure means, a fluid container from which fluid is entered into the cylinder, a fluid supply pipe connecting the container with the said pressure means for passage of fluid to the latter but not in the other direction, a pipe for relieving pressure back to the container for the purposes explained, a manually operated valve in each pipe, the closing of one simultaneously and automatically opening the other, a pipe connection between the pump and cylinder, a check valve therein, a pipe connecting the cylinder and fluid container, and a cut-off valve therein all for the purposes described.

6. A cylinder and piston, a pump, a fluid container from which fluid is pumped into the cylinder, a fluid supply pipe for connecting the container with the pump, means for relieving pump pressure for the purposes explained, a manually operated valve in the pipe, a valve in said means and simultaneously and automatically opened as the first valve is closed, a pipe connection between the pump and cylinder, a check valve therein, a pipe connecting the cylinder and fluid container, and a cut-off valve therein all for the purposes described.

7. A cylinder and piston, a pump, a fluid container from which fluid is pumped into the cylinder, a fluid supply pipe for connecting the container with the pump for passage of fluid to the pump, but not in the other direction, a cut-off valve and a check valve therein, a relief pipe connected to the last named pipe between the cut-off valve thereof and the pump, and the cut-off valve in the fluid supply pipe being closed to stop the flow of fluid to the pump, the valve in the relief pipe being opened to relieve the pump pressure to the container, a pipe connecting the pump with the cylinder, a check valve therein, a pipe connecting the cylinder with the fluid container, and a valve therein all for the purposes explained.

8. A cylinder and its piston, pressure means for entering a fluid to the cylinder to raise the piston, coacting manually operated means for simultaneously interrupting the flow of fluid passing toward the cylinder and for relieving the pressure present in said pressure means, and other means by which to hold the fluid within the cylinder to sustain the piston in its raised position.

9. In a lifting device the combination of a support, a fluid receiving cylinder mounted thereon, a piston and its piston-rod for the cylinder, a source of fluid supply carried therewith, fluid pumping means for entering fluid to such cylinder to move the piston, rod members attached at one end to the piston-rod and at their other ends to the support for bracing and guiding the piston-rod, means for arresting the upward movement of the piston, and other means for permitting discharge of the fluid from the cylinder to the fluid source to allow the piston to lower.

10. A fluid receiving cylinder mounted to tilt on a substantially horizontal axis, a piston and its piston-rod therefor, fluid pumping means for entering fluid to the cylinder to operate the piston, means attached to the piston-rod to brace and guide it, means for arresting the movement of the piston due to the fluid pressure thereagainst, and other means for permitting discharge of the fluid from the cylinder to allow the piston to seek its normal position or position of rest.

11. A cylinder, a piston therefor, a continuously operated pump for entering fluid beneath the piston, a receptacle for the fluid passing to and from the cylinder, a valve for interrupting the flow of fluid from the receptacle to the said cylinder, and a valve simultaneously operated by the first for relieving the pressure at the pump, and a valve for holding the fluid within the cylinder to sustain the piston in a fixed raised position and also to permit the fluid to flow out of the cylinder when it is desired to permit the piston to lower.

12. A cylinder mounted to pivot on a horizontal axis, a piston therefor, a pump situated opposite the pivot of the cylinder for entering a fluid to the latter for raising the piston, a fluid reservoir, a pipe connecting it with the pump, a pipe connecting the pump with the bottom of the cylinder, check valves in said pipes for permitting flow of fluid in but one direction and through which fluid is drawn from the reservoir and entered into the cylinder by the pump, a pipe for the return of the fluid from the cylinder to the reservoir, and a valve in said pipe.

13. A vertical cylinder adapted to oscillate, a piston for the cylinder, a member connected to the piston-rod and supported at its other end for guiding and tilting the cylinder and piston for the purposes set forth, a continuously acting pump for entering fluid to the cylinder for raising the piston, means for simultaneously interrupting the flow of fluid from the pump to the cylinder and relieving the pump pressure caused by such interruption, and means for holding the pumped fluid within the cylinder and then liberating it.

14. A cylinder and its piston, a device for pumping the fluid thereinto, a pipe connected between the pump and the cylinder, a check valve in said pipe, a fluid supply tank, a pipe connecting the same with the pump, a check valve in the pipe, a relief pipe connecting the last named pipe with the said supply tank, a cut-off valve in both the last named pipes, and means for operating both of them positively and simultaneously.

15. A cylinder and its piston, a continuously operating pump, a pipe connecting the pump and the cylinder, a check valve in the pipe, a fluid vessel, a pipe connecting the same with the pump, a check valve and a cut-off valve in said pipe, a relief pipe connecting the last named pipe with the fluid vessel between the pump and the said cut-off and check valve, and a cut-off valve in the relief pipe, and means connecting both cut-off valves by which they are simultaneously and positively operated.

16. A cylinder and its piston, a continuously acting pump, a pipe connecting the pump with the cylinder, a check valve therein, a fluid vessel, a pipe connecting it with the pump, a cut-off valve and a check valve in said pipe, a relief pipe connecting said vessel with the last named pipe at a point between the pump and the cut-off and check valves, a cut-off valve in the relief pipe, and means connecting one cut-off valve with the other for operating one of the valves automatically when the other is operated.

17. A cylinder and its piston, a continuously acting pump, a pipe connecting the pump with the cylinder, a check valve therein, a fluid vessel, a pipe connecting the same with the pump, a check valve and cut-off valve in said pipe, a relief pipe connected with the last named pipe between the pump and the valves, a cut-off valve in the relief pipe, means by which the cut-off valves are operated simultaneously, a pipe directly connecting the cylinder with the fluid vessel, and a cut-off valve therein.

18. A cylinder and its piston, a continuously acting pump having fluid connection with the bottom of the cylinder, a check valve between the pump and the cylinder, a fluid vessel having connection with the pump, a check valve between the pump and vessel, a relief pipe for relieving the pump pressure, a cut-off valve in the latter pipe, and a cut-off valve in the pump and vessel connection, a discharge pipe connected from the cylinder into the fluid vessel, and a valve in said pipe for closing the same and for governing the amount of fluid passing therethrough.

19. A portable pivotally mounted cylinder and its piston, a continuously acting pump having a fluid connection with one end of the cylinder to operate the piston by pressure, a check valve in such connection, a fluid vessel also portable, a pipe connecting the vessel and the pump, a check valve therein, there being a relief passage between the check valve and said pump back to said vessel, a cut-off valve in the pipe also between the check valve and the pump and lying between the said check valve and the relief passage, a cut-off valve in said relief passage, and a valve controlled pipe connected between the cylinder and vessel.

20. A portable oscillating cylinder and its piston, a continuously acting pump having fluid connection with one end of the cylinder, a check valve in such connection, a fluid vessel also portable, a pipe connecting the vessel and the pump, a check-valve therein, a pressure relief for the pipe between the check valve and said pump, a single cut-off valve in the pipe between the check valve and the pump and between said check valve and the pressure relief, means by which the opening of one valve closes the other simultaneously, a pipe connecting the fluid vessel with the cylinder at the same end with which the pump is connected, and a controlling valve in said pipe.

21. A cylinder adapted to oscillate upon a horizontal axis, a piston therefor, a pump opposite said axis, a source of fluid supply for the pump, a fluid connection between the pump and the cylinder, a fluid connection between the pump and the fluid source, and a fluid connection between the fluid source and the cylinder for the purposes set forth, said pump and its connections oscillating with said cylinder.

22. A cylinder mounted upon a horizontal axis and adapted to oscillate thereon, a pump opposite said axis and having its piston axially in line with the axis on which the cylinder oscillates, a fluid container, a pipe connection between the container and the pump, a pipe connection between the pump and the cylinder, and a pipe connection between the container and the cylinder for the purposes set forth, all adapted to move with said cylinder in its oscillating movements.

23. A cylinder mounted to oscillate on a transverse axis, a pump opposite said axis and in a line therewith, a fluid container, a pipe connection between the container and the pump, a pipe connecting the pump and the cylinder, a pipe connecting the cylinder and the container for the purposes described, the pump, the pipe connections and the container all being bodily carried on said cylinder and movable therewith as it oscillates for the purposes set forth.

In testimony whereof I affix my signature, in presence of two witnesses.

JOSEPH EDWARD CAMP.

Witnesses:
B. F. NAFZIGER,
ANDREW SPRINGER.